(12) United States Patent
Jain et al.

(10) Patent No.: US 9,917,768 B2
(45) Date of Patent: *Mar. 13, 2018

(54) SYSTEM AND METHOD FOR REFLECTING FEC ROUTE INFORMATION

(71) Applicant: ALCATEL LUCENT, Boulogne-Billancourt (FR)

(72) Inventors: Pradeep G Jain, Mountain View, CA (US); Kanwar D Singh, Mountain View, CA (US)

(73) Assignee: Provenance Asset Group LLC, Essex, CT (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/717,378

(22) Filed: May 20, 2015

(65) Prior Publication Data
US 2015/0256452 A1 Sep. 10, 2015

Related U.S. Application Data

(63) Continuation of application No. 13/799,009, filed on Mar. 13, 2013, now Pat. No. 9,042,369.

(51) Int. Cl.
*H04L 12/723* (2013.01)
*H04L 12/46* (2006.01)
*H04L 12/721* (2013.01)

(52) U.S. Cl.
CPC ........ *H04L 45/507* (2013.01); *H04L 12/4641* (2013.01); *H04L 45/68* (2013.01)

(58) Field of Classification Search
CPC ......... H04L 45/50; H04L 45/10; H04L 45/00; H04L 41/084; H04L 67/14; H04L 67/146; H04L 45/507; H04L 45/04
See application file for complete search history.

(56) References Cited

U.S. PATENT DOCUMENTS

| | | | | |
|---|---|---|---|---|
| 6,967,927 B1* | 11/2005 | Dugeon | ............ | H04Q 11/0478 370/236.1 |
| 7,787,380 B1* | 8/2010 | Aggarwal | ............... | H04L 41/12 370/236 |
| 8,179,905 B1* | 5/2012 | Napierala | ........... | H04L 12/4641 370/237 |
| 8,422,514 B1* | 4/2013 | Kothari | ............... | H04L 12/4633 370/351 |
| 8,611,359 B1* | 12/2013 | Kompella | ............... | H04L 45/04 370/401 |
| 2004/0156313 A1* | 8/2004 | Hofmeister | ......... | H04L 12/4633 370/229 |

(Continued)

OTHER PUBLICATIONS

The International Search Report and the Written Opinion of the International Searching Authority, or the Declaration in PCT/US2014/020385, dated Aug. 1, 2014, Alcatel Lucent, Applicant, 17 pages.

(Continued)

*Primary Examiner* — Jung-Jen Liu
(74) *Attorney, Agent, or Firm* — Dinsmore & Shohl LLP

(57) ABSTRACT

Systems, methods, architectures and/or apparatus for reflecting information between provider equipment (PE) nodes associated with a Virtual Private LAN Service (VPLS) via a network element adapted to operate as a Forwarding Equivalence Class (FEC) Reflector (FR) node.

20 Claims, 4 Drawing Sheets

(56) References Cited

U.S. PATENT DOCUMENTS

| | | | | |
|---|---|---|---|---|
| 2006/0029032 | A1* | 2/2006 | Allan | H04L 12/4679 370/351 |
| 2006/0062218 | A1* | 3/2006 | Sasagawa | H04L 45/04 370/389 |
| 2006/0171323 | A1* | 8/2006 | Qian | H04L 45/10 370/252 |
| 2008/0225864 | A1* | 9/2008 | Aissaoui | H04L 12/4633 370/401 |
| 2008/0253381 | A1* | 10/2008 | Ward | H04L 45/10 370/396 |
| 2010/0124180 | A1* | 5/2010 | Benkis | H04L 12/2602 370/252 |
| 2010/0302973 | A1* | 12/2010 | Lange | H04L 12/4641 370/254 |
| 2011/0040885 | A1* | 2/2011 | Jounay | H04L 45/00 709/228 |
| 2011/0261824 | A1* | 10/2011 | Jounay | H04L 41/0806 370/395.53 |
| 2012/0099598 | A1* | 4/2012 | Cao | H04L 45/68 370/392 |
| 2012/0099861 | A1* | 4/2012 | Zheng | H04L 45/68 398/45 |
| 2012/0236730 | A1* | 9/2012 | Zhou | H04L 45/245 370/244 |
| 2013/0094474 | A1* | 4/2013 | Le Clech | H04W 36/0016 370/331 |
| 2013/0107725 | A1* | 5/2013 | Jeng | H04L 45/16 370/248 |
| 2013/0121169 | A1* | 5/2013 | Zhao | H04L 43/00 370/242 |
| 2013/0208582 | A1* | 8/2013 | Wijnands | H04L 49/552 370/218 |
| 2013/0266006 | A1* | 10/2013 | Dutta | H04L 45/28 370/389 |

OTHER PUBLICATIONS

Kompella K et al: "Virtual Private LAN Service (VPLS) Using BGP for Auto-Discovery and Signaling; rfc4761.txt", Jan. 1, 2007, Jan. 1, 2007 (Jan. 1, 2007), XP015055050; ISSN: 0000-0003; p. 3, paragraph 1. Introduction—p. 4, paragraph 1.1. Scope of This Document; figure 1; p. 6, paragraph 3. Control Plane—p. 8, paragraph 3.2. Signaling; p. 17, paragraph 3.6. Hierarchical BGP VPLS.

Lasserre M et al.: "Virtual Private LAN Service (VPLS) Using Label Distribution Protocol (LDP) Signaling; rfc4762.5xt", Jan. 1, 2007, Jan. 1, 2007 (Jan. 1, 2007), XP015055051; ISSN: 000-0003; p. 1, paragraph Abstract; p. 7, paragraph 6. Control Plane—p. 9, paragraph 6.2.1. Using the Generalized PWid FEC Element.

Bates Cisco Systems R Chandra E Chen Redback Networks T: "BGP Route Reflection—An Alternative to Full Mesh IBGP; rfc2796.txt", Apr. 1, 2000; Apr. 1, 2000 (Apr. 1, 2000), XP015008579; ISSN: 00000003; the whole document.

Martini L et al: "Pseudowire Setup and Maintenance Using the Label Distribution Protocol (LDP); rfc4447.txt", Apr. 1, 2006, Apr. 1, 2006 (Apr. 1, 2006); XP015046298; ISSN: 0000-003; p. 7, paragraph 5. LDP—p. 16, paragraph 5.3.3. Signaling Procedures.

* cited by examiner

SYSTEM AND METHOD FOR REFLECTING FEC ROUTE INFORMATION

CROSS-REFERENCE TO RELATED APPLICATION

This application is a continuation of U.S. patent application Ser. No. 13/799,009, filed on Mar. 13, 2013, entitled "SYSTEM AND METHOD FOR REFLECTING FEC ROUTE INFORMATION" which is hereby incorporated herein by reference.

FIELD OF THE INVENTION

The invention relates generally to communication networks and, more specifically but not exclusively, to improving LDP scaling in full mesh Pseudo-Wire applications.

BACKGROUND

Label Distribution Protocol (LDP) enables peer label switch routers (LSRs) in a Multi-Protocol Label Switching (MPLS) network to exchange label binding information for supporting hop-by-hop forwarding. Various Layer 2 services (such as Frame Relay, Asynchronous Transfer Mode, Ethernet and the like) may be emulated over an MPLS backbone by encapsulating the Layer 2 Protocol Data Units (PDU) and transmitting them over a pseudowire (PW).

Typical VPLS (Virtual Private LAN Service) scenarios call for a full mesh of Pseudo-Wires between participating provider edge (PE) nodes, which is achieved using a full mesh of targeted LDP (T-LDP) session connectivity. This requires each PE node to maintain a large number of T-LDP sessions, which is challenging in High Availability scenarios since the cost of maintaining TCP sessions is very high.

SUMMARY

Various deficiencies in the prior art are addressed by systems, methods, architectures and/or apparatus for reflecting information between provider equipment (PE) nodes associated with a Virtual Private LAN Service (VPLS) via a network element adapted to operate as a Forwarding Equivalence Class (FEC) Reflector (FR) node.

A method according to one embodiment comprises designating a node to operate as a Forwarding Equivalence Class (FEC) Reflector (FR) node; selecting a VPLS instance for concentration at the FR node; and establishing a T-LDP session between the FR node and one or more PE nodes associated with the selected VPLS instance; wherein the PE nodes are adapted to exchange common VPLS information via the FR node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be discussed within the context of systems, methods, architectures and/or apparatus implementing a Forwarding Equivalence Class (FEC) Reflector (or FR) functionality within the context of a relatively large network in which a large number of participating Label Switching Routers (LSRs) such as provider edge (PE) devices are used to implement VPLS (Virtual Private LAN Service) in a manner avoiding the use of full mesh of targeted Label Distribution Protocol (T-LDP) session connectivity. However, it will be appreciated by those skilled in the art that the invention has broader applicability than described herein with respect to the various embodiments.

Generally speaking, the invention provides that every LSR/PE establishes a single T-LDP session to a pre-configured node or network element denoted herein as a Forwarding Equivalence Class (FEC) Reflector (FR) to thereby avoid the need to configure full mesh of T-LDP sessions between all PEs. For example, each LSR/PE uses a Label Mapping Message including a FEC TLV and a Label TLV to advertise to its LDP peers a binding of a FEC to a label. In this manner, specific labels are assigned by a LSR to various pseudo-wires terminating appropriate FEC data at the LSR.

Figure 1:
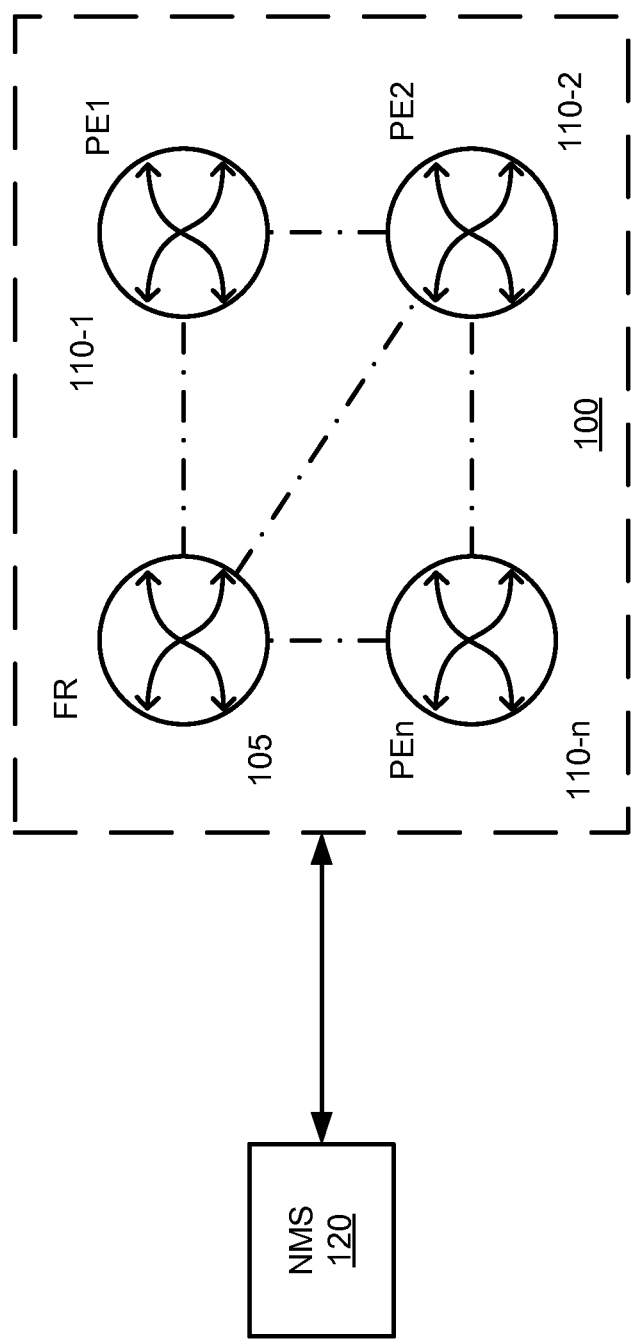
FIG. 1 depicts a high-level block diagram of a network benefiting from various embodiments.

The term FEC is broadly construed herein to describe a set of packets with similar and/or identical characteristics which may be forwarded the same way, such as by being bound to the same MPLS label. Characteristics determining the FEC of a higher-layer packet depend on the configuration of the LSR/PE, typically including at least the destination IP address. Quality of Service (QoS), customer, service type, traffic type and the like may also be used as characteristics for FEC purposes FIG. 1 depicts a high-level block diagram of a network benefiting from various embodiments. Specifically, the network 100 comprises a Forwarding Equivalence Class (FEC) Reflector (FR) 105 in communication with each of a plurality of provider edge (PE) routers 110-1 through 110-n (collectively PE routers 110). The FR node 105 is responsible for reflecting FEC information to/from the various PE routers 110. In various embodiments the FR node 105 acts as a PE router, while in other embodiments the FR node 105 does not act as a PE router. The network 100 is also associated with a network management system (NMS) 120.

Each of the PE routers 110 is depicted as implementing the same (i.e., a common) Virtual Private LAN Service (VPLS) instance supporting a large number of T-LDP sessions. It is noted that all of the PE routers 110 are depicted as being interconnected with each other in a full mesh topology. However, such full mesh interconnection is not necessary within the context of the various embodiments.

In various embodiments, the FR 105 comprises a network routing component providing an alternative to the logical full-mesh requirement of the T-LDP sessions. The FR 105 acts as a focal point for the T-LDP sessions such that multiple provider edge (PE) routers 110 supporting the T-LDP sessions can peer with or concentrate at a central point rather than peer with every other router in a full mesh. The FR 105 operates as a FEC route-reflector server at that central point, while other PE routers act as FEC route-reflector clients.

Various mechanisms for establishing a Forwarding Equivalence Class (FEC) Reflector (FR) functionality, such as for one or more Virtual Private LAN Service (VPLS) instances supporting a large number of T-LDP sessions will be now be described.

The various routing, switching, control and other functions are not specifically identified within the context of FIG. 1. Generally speaking, the FR 105 and PE routers 110 implement the various functions associated with Label Switched Routers within the context of an MPLS system. The various packet processing and/or control methodologies described herein are implemented by computing devices in or associated with the FR 105 and/or PE routers 110, such as described below with respect to FIG. 4.

The NMS 120 is a network management system adapted for performing the various management functions described herein. The NMS 120 is adapted to communicate with nodes 105 and 110 of the network. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein. The NMS 120 may be implemented as a general purpose computing device or specific purpose computing device, such as described below with respect to FIG. 4.

Figure 2:
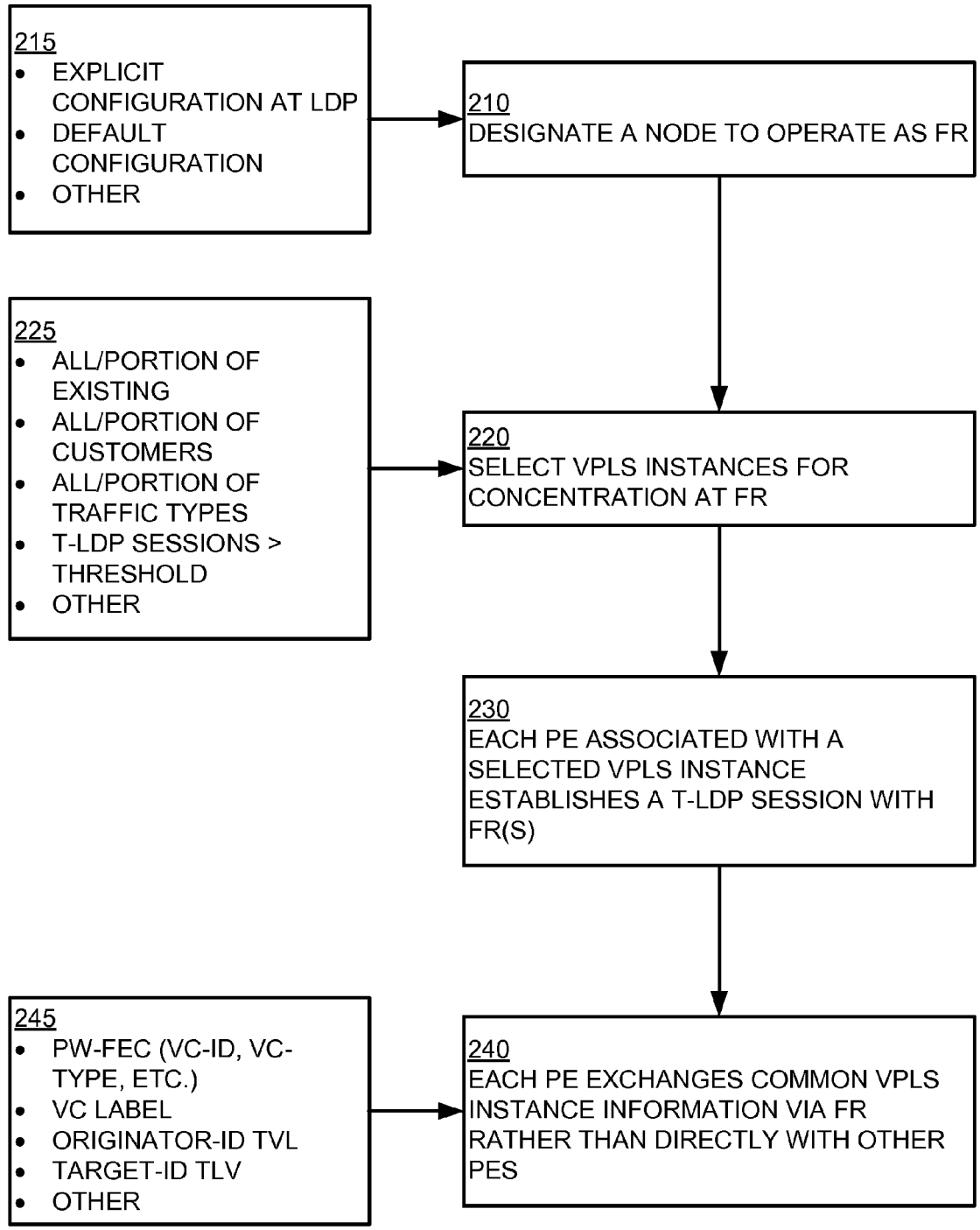
FIGS. 2-3 depict flow diagrams of methods according to various embodiments.

FIG. 2 depicts a flow diagram of a method according to one embodiment. Specifically, the method 200 of FIG. 2 is adapted to establish a Forwarding Equivalence Class (FEC) Reflector (FR) functionality for one or more Virtual Private LAN Service (VPLS) instances supporting a large number of T-LDP sessions.

At step 210, an available node or network element (e.g., one of a plurality of provider edge (PE) routers) is designated to operate as a Forwarding Equivalence Class (FEC) Reflector (FR). For example, referring to FIG. 1, the FR 105 may comprise a node or network element similar to the PE routers 110 or some other node or network element. Referring to box 215, a node may be designated as an FR node via explicit configuration such as at the LDP level, via a default configuration (e.g., a preferred node, a default node, a node matching a lowest link cost criteria and the like), or via some other means.

At step 220, one or more VPLS instances are selected for concentration at the designated FR(s). Referring to box 225, the selected VPLS instances may comprise all or a portion of existing VPLS instances or PEs 110, all or a portion of existing VPLS instances associated with specific customers or traffic types, all or a portion of those VPLS instances having a number of T-LDP sessions above a threshold level. Other criteria may also be used to select some or all of the VPLS sessions associated with one or more of the PE routers 110. Further, the various criteria may be combined in any manner.

At step 230, each PE associated with a selected VPLS instance establishes a T-LDP session with the FR.

At step 240, each of the PEs or nodes having established a T-LDP session with the FR(s) exchanges common VPLS instance information via the FR(s) rather than directly with the other PEs or nodes common to that VPLS instance. Referring to box 245, each PE needs to exchange the PW-FEC (VC-ID, VC-Type etc.) and respective VC Label with every other PE for its common VPN context. As will be described in more detail below, various embodiments contemplate that one or both (or neither) of two newly defined type-length-value (TLV) elements denoted herein as "Originator-ID TVL" and a "Target-ID TLV" may also be used.

Within the context of the various embodiments, each PE node still retains a full mesh of pseudo wires to all of the other PE nodes of a common VPLS instance (e.g., such as defined in the LDP-VPLS Standard). However, according to the various embodiments each PE or node now uses its respective T-LDP session to exchange information such as FEC/VC-Label Information and the like with the other PE nodes of the common VPLS instance.

Signaling/Processing at Ingress PE Node

Generally speaking, the various VPLS-related embodiments contemplate that FEC information is signaled in a LDP Label-Mapping Message to the FR Node rather than to a peer PE Node.

Various embodiments further contemplates that Originator PE and Target PE Node information is carried using one or more optional TLVs, denoted herein as a "Originator-ID TVL" and a "Target-ID TLV", which are defined herein as follows:

Originator-ID TVL: Contains the System Address of an Originator PE Node. This address is used at a Target PE node to identify the end-point of the Pseudo-Wire from the Originator PE node terminating at the Target PE node.

Target-ID TLV: Contain System Address of a Target PE Nodes. This address is used at an FR Node to reflect the FEC/VC-Label information from an Originator PE node to the correct Target PE Node.

In various embodiments, the above-defined TLVs are populated into Label Mapping Messages only when FR configuration is present on the PE Node. Various embodiments using neither of the TLV's, both of these TLV's or only one of these TLV's are contemplated by the inventors.

Signaling/Processing at FR Node(s)

Figure 3:
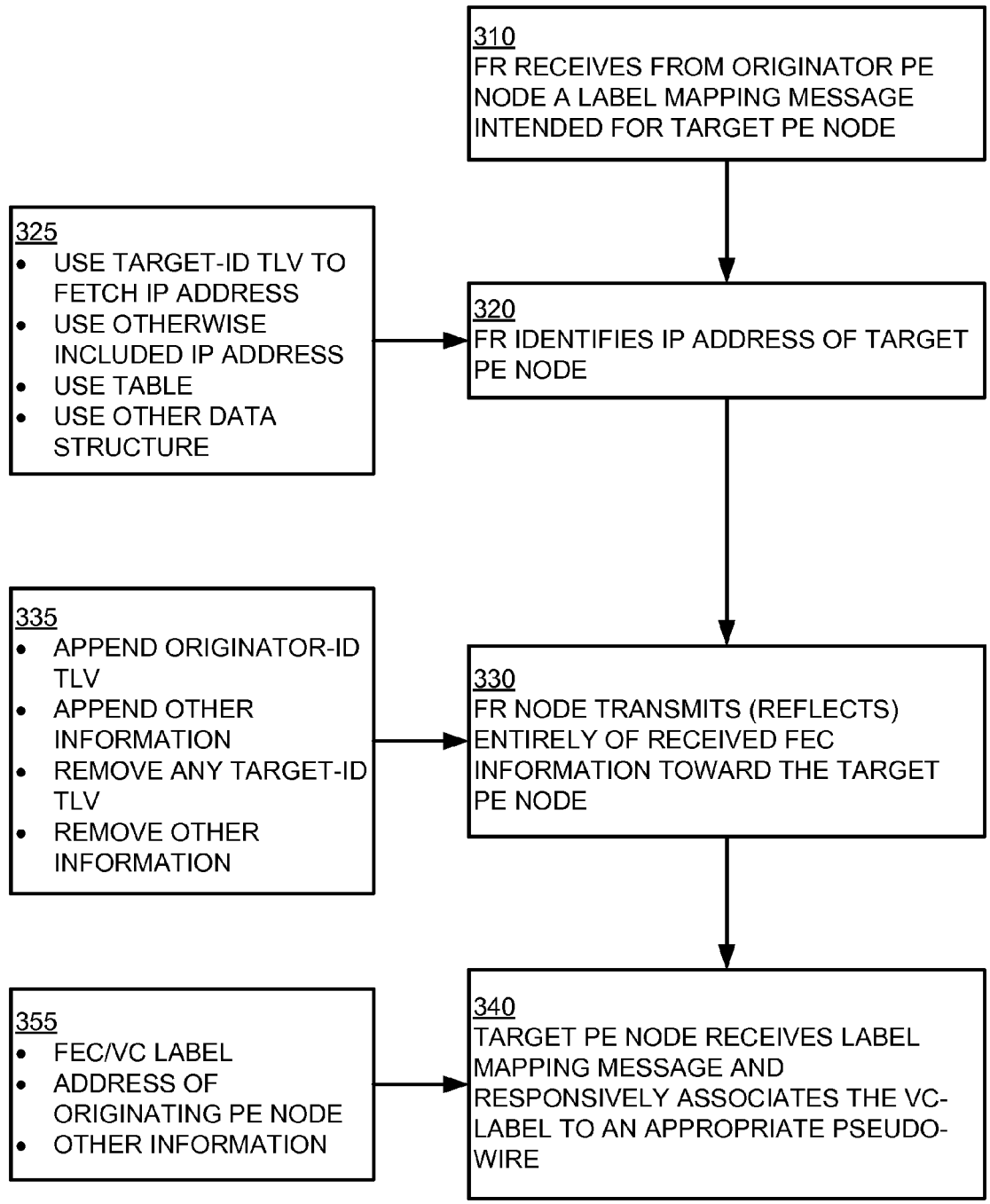

FIG. 3 depicts a flow diagram of a method of FR operation according to one embodiment.

At step 310, a FR receives a Label Mapping Message intended for a Target PE node. The Label Mapping Message typically includes a FEC TLV and a Label TLV to advertise to the LDP peers of the Originating PE node a binding of a FEC to a label.

At step 320, the FR identifies the IP addresses of the Target PE node. Referring to box 325, in an embodiment utilizing the Target-ID TLV, a FR Node receiving a Label Mapping Message with FEC TLV responsively searches for a Target-ID TLV to fetch thereby an IP address of a Target PE Node.

In an embodiment not utilizing the Originator-ID TLV, the Target PE node IP address should be included within the Label Mapping Message as part of an "IP destination" field or other data elements, depending upon the message formatting used. Various other embodiments utilize tables or other data structures directly indicative or indirectly indicative (i.e., suggestive) of IP addresses associated with actual or potential Target PE nodes. In these embodiments, message context and other information may be used to identify the IP address of the Target PE node.

At step 330, the FR node transmits (i.e., "reflects") the entirety of the received Label Mapping Message/FEC information toward the Target PE node. For example, the FEC TLV, Label TLV and (optionally) other message information is transmitted toward the Target PE node. The message information is generally reflected transparently (i.e., without any modification) to the Target PE Node. Referring to box 335, for embodiments utilizing the Originator-ID TLV, if the incoming Label Mapping Message does not contain Originator-ID TLV, then the FR Node appends an appropriate Originator-ID TLV to the Label Mapping Message prior to forwarding the Label Mapping Message to the Target PE. In addition, FR Node may leave or remove an existing Target-ID TLV when reflecting Label Mapping Message, since the Target-ID TLV is generally not used at the Target PE Node.

In an embodiment not utilizing the Originator-ID TLV, the Originator PE node IP address may be included within the Label Mapping Message as part of an "IP source" field or other data elements, depending upon the message formatting used.

Signaling/Processing at Egress PE Node

At step 340, the Target PE receives the Label Mapping Message reflected to it by the FR and responsively associates the VC-label to an appropriate pseudo-wire. Referring to box 345, upon receiving the Label Mapping Message from the FR, the Target PE is now in possession of the FEC/VC Label and the IP address of the Originator PE node (e.g., as "source address" data or via Originator-ID TLV). Based on all this information, Target PE can successfully associate the VC-Label of the FEC to the appropriate Pseudo-Wire between the Originator and Target PEs.

The above-described embodiments provide a number of advantages, including the following: (1) Every PE Node would now require a Single T-LDP Session to an FR Node, rather than full mesh of T-LDP sessions to all the other PE nodes; (2) Minimal Configuration Changes are required, since only a single line of additional configuration data at the Global LDP Level may be used to designate a particular node as an FR Node; (3) Since the FR Node is ignorant of FEC TLV/VC-Label information, no extra Label/FEC installation is required; and (4) No changes or extensions are required to the various L2VPN standards.

Figure 4:
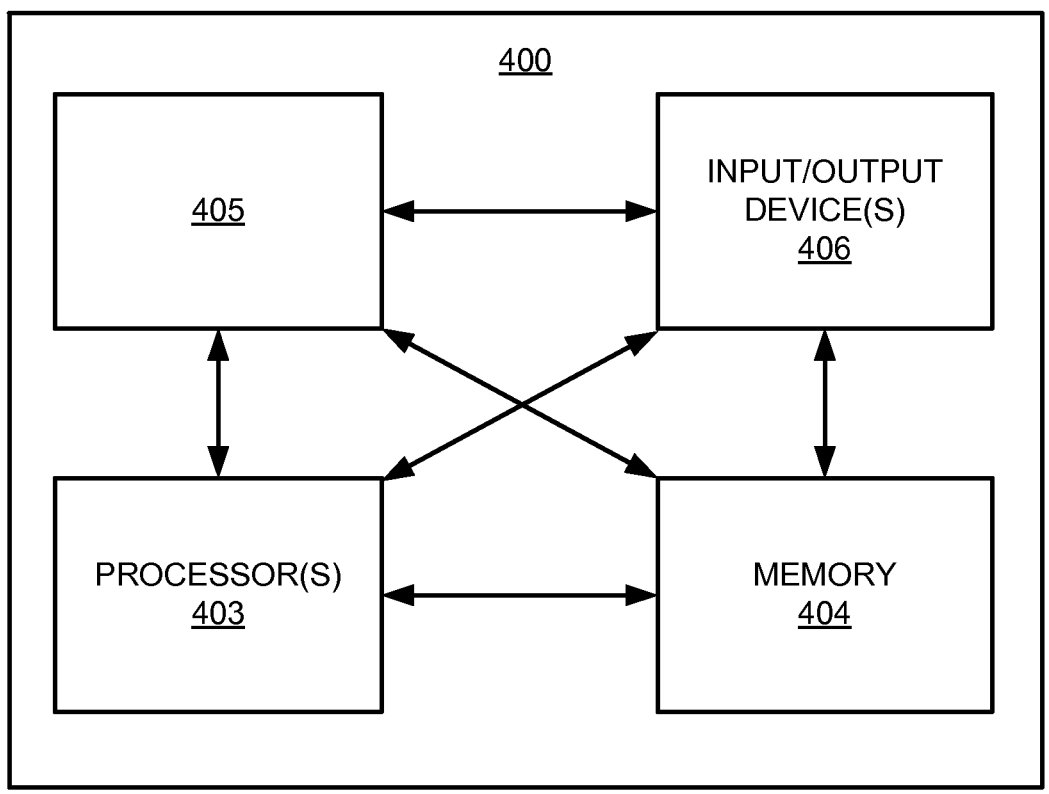
FIG. 4 depicts a high-level block diagram of a computer suitable for use in performing the functions described herein.

FIG. 4 depicts a high-level block diagram of a computer suitable for use in performing functions described herein. Specifically, the computer 400 described herein is well adapted for implementing the various functions described above with respect to the FR 105 and PE routers 110, as well as the methods/mechanisms described with respect to the various figures.

As depicted in FIG. 4, computer 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for reflecting Virtual Private LAN Service (VPLS) information between provider equipment (PE) nodes associated with a VPLS instance in a network, comprising:
   supporting, by a Forwarding Equivalence Class (FEC) reflector (FR) node for each of the PE nodes associated with the VPLS instance, establishment of a respective targeted label distribution protocol (T-LDP) session between the FR node and the respective PE node; and
   supporting, by the FR node, exchange of VPLS information between two of the PE nodes using the respective T-LDP sessions of the two of the PE nodes.

2. The method of claim 1, wherein the two of the PE nodes include a first PE node and a second PE node, the method further comprising:
   receiving, by the FR node from the first PE node via the respective T-LDP session of the first PE node, a label mapping message intended for the second PE node, wherein the label mapping message comprises VPLS information of the first PE node; and
   sending, by the FR node toward the second PE node via the respective T-LDP session of the second PE node, the VPLS information of the first PE node.

3. The method of claim 2, wherein the label mapping message comprises an Originator-ID type-length-value (TLV), the method further comprising:
   sending, by the FR toward the second PE node, the Originator-ID TLV.

4. The method of claim 3, wherein the Originator-ID TLV comprises an address of the first PE node.

5. The method of claim 2, wherein the label mapping message comprises a Target-ID type-length-value (TLV), the method further comprising:

identifying, by the FR node based on the target-ID TLV, the second PE node.

6. The method of claim 5, the method further comprising: removing, by the FR node, the Target-ID TLV from the label mapping message.

7. The method of claim 2, the method further comprising: adding, by the FR node to the label mapping message based on a determination that the label mapping message does not include an Originator-ID type-length-value (TLV), the Originator-ID TLV.

8. The method of claim 1, wherein the VPLS information comprises a pseudowire (PW)-FEC of a PW between the two of the PE nodes.

9. The method of claim 8, wherein the PW-FEC of the PW between the two of the PE nodes comprises a virtual circuit (VC) identifier (VC-ID) and a VC type (VC-Type).

10. The method of claim 9, wherein the VPLS information further comprises a VC label.

11. The method of claim 1, wherein the VPLS information comprises a Virtual Circuit (VC) label.

12. The method of claim 1, wherein the VPLS information is exchanged using a label mapping message.

13. The method of claim 12, wherein the label mapping message further comprises at least one of an Originator-ID type-length-value (TLV) or a Target-ID TLV.

14. An apparatus configured to reflect Virtual Private LAN Service (VPLS) information between provider equipment (PE) nodes associated with a VPLS instance in a network, comprising:
a processor and a memory communicatively connected to the processor, the processor configured to:
support, by a Forwarding Equivalence Class (FEC) reflector (FR) node for each of the PE nodes associated with the VPLS instance, establishment of a respective targeted label distribution protocol (T-LDP) session between the FR node and the respective PE node; and
support, by the FR node, exchange of VPLS information between two of the PE nodes using the respective T-LDP sessions of the two of the PE nodes.

15. An apparatus configured to reflect Virtual Private LAN Service (VPLS) information between provider equipment (PE) nodes associated with a VPLS instance in a network, comprising:
a processor and a memory communicatively connected to the processor, the processor configured to:
receive, by a Forwarding Equivalence Class (FEC) reflector (FR) node from a first PE node via a first targeted label distribution protocol (T-LDP) session between the first PE node and the FR node, a label mapping message comprising VPLS information; and
send, by the FR node toward the second PE node via a second T-LDP session between the FR node and the second PE node, the VPLS information.

16. An apparatus, comprising:
a processor and a memory communicatively connected to the processor, the processor configured to:
establish, by a first provider equipment (PE) node associated with a Virtual Private LAN Service (VPLS) instance, a pseudowire (PW) between the first PE node and a second PE node associated with the VPLS instance;
establish, by the first PE node, a targeted label distribution protocol (T-LDP) session between the first PE node and a Forwarding Equivalence Class (FEC) reflector (FR) node; and
send, by the first PE node via the T-LDP session, VPLS information of the VPLS instance.

17. The apparatus of claim 16, wherein the VPLS information of the VPLS instance is sent using a label mapping message.

18. The apparatus of claim 17, wherein the label mapping message comprises at least one of an Originator-ID type-length-value (TLV) or a Target-ID TLV.

19. The apparatus of claim 18, wherein the Originator-ID TLV comprises an address of the first PE node.

20. The apparatus of claim 18, wherein the Target-ID TLV comprises an address of the second PE node.

* * * * *